(12) United States Patent
Tsai

(10) Patent No.: US 9,725,124 B2
(45) Date of Patent: Aug. 8, 2017

(54) HIDDEN ADJUSTABLE SEAT TUBE DEVICE FOR BICYCLE

(71) Applicant: Chin-Sung Tsai, New Taipei (TW)

(72) Inventor: Chin-Sung Tsai, New Taipei (TW)

(*) Notice: Subject to any disclaimer, the term of this patent is extended or adjusted under 35 U.S.C. 154(b) by 0 days.

(21) Appl. No.: 14/858,851

(22) Filed: Sep. 18, 2015

(65) Prior Publication Data

US 2017/0080990 A1 Mar. 23, 2017

(51) Int. Cl.
*A47C 3/32* (2006.01)
*B62J 1/08* (2006.01)
*A47C 3/40* (2006.01)
*F16C 1/18* (2006.01)

(52) U.S. Cl.
CPC ...... *B62J 1/08* (2013.01); *A47C 3/32* (2013.01); *A47C 3/40* (2013.01); *B62J 2001/085* (2013.01); *F16C 1/18* (2013.01)

(58) Field of Classification Search
CPC ......... B62J 1/08; B62J 2001/085; A47C 3/32; A47C 3/40; A47C 3/30; A47C 3/20; A47C 3/22; A47C 3/24; A47C 3/245; A47C 3/265; B60N 2/1665; F16C 1/18; A61G 5/1059
USPC .............. 248/157, 132, 161, 421–423; 297/215.13, 344.19, 339, 338
See application file for complete search history.

(56) References Cited

U.S. PATENT DOCUMENTS

| | | | | |
|---|---|---|---|---|
| 5,127,804 A * | 7/1992 | Chappell | ............ | B62J 11/02 280/201 |
| 5,324,174 A * | 6/1994 | Diotte | ............ | B62J 1/06 248/601 |
| 5,826,935 A * | 10/1998 | DeFreitas | ............ | B62K 19/36 248/404 |
| 8,308,124 B2 * | 11/2012 | Hsu | ............ | B62J 1/08 248/161 |
| 8,550,551 B2 * | 10/2013 | Shirai | ............ | B62K 19/36 280/221 |
| 8,752,893 B2 * | 6/2014 | Chien | ............ | B62J 1/08 248/157 |
| 2005/0022661 A1 * | 2/2005 | Zanden | ............ | A47C 3/30 91/437 |
| 2014/0112703 A1 * | 4/2014 | Chen | ............ | B62J 1/08 403/109.2 |
| 2015/0145294 A1 * | 5/2015 | Kench, III | ............ | B62K 19/36 297/215.13 |

(Continued)

*Primary Examiner* — Nkeisha Smith
(74) *Attorney, Agent, or Firm* — Alan D. Kamrath; Kamrath IP Lawfirm, P.A.

(57) ABSTRACT

A hidden adjustable seat tube device for a bicycle has a lower tube assembly and an upper tube assembly. The lower tube assembly has a first rod and a driving element. The first rod has a mounting groove that is defined in an inner surface of the first rod. The driving element is mounted rotatably on the first rod. The upper tube assembly is mounted movably in the lower tube assembly. A manipulator is connected to the driving element. A transmission cable is mounted through the mounting groove and mounted in the manipulator and the driving element respectively. A retractable element is mounted inside the upper tube assembly, and abuts the driving element. The transmission cable is hid inside the lower tube assembly to organize the transmission cable easily and to mount the transmission cable in the bicycle neatly.

11 Claims, 7 Drawing Sheets

(56) References Cited

U.S. PATENT DOCUMENTS

| | | | |
|---|---|---|---|
| 2015/0191208 A1* | 7/2015 | Hsu | B62J 1/06 403/322.3 |
| 2015/0232142 A1* | 8/2015 | Shirai | B62J 1/08 403/104 |
| 2015/0239517 A1* | 8/2015 | Shirai | B62J 1/08 403/104 |

* cited by examiner

HIDDEN ADJUSTABLE SEAT TUBE DEVICE FOR BICYCLE

BACKGROUND OF THE INVENTION

1. Field of the Invention

The present invention relates to a seat tube of a bicycle and, more particularly, to a hidden adjustable seat tube device for a bicycle that partially hides a transmission cable inside a seat tube to organize the transmission cable easily, to eliminate multiple redundant segments of the transmission cable, and to mount the transmission cable in the bicycle neatly.

2. Description of the Related Art

A bicycle is a green transportation device that is easy to operate. The bicycle is powered and operated by a user's physical effort without a supply of petroleum that is environmentally hazardous. Thus, transportation through bicycles makes users excise, reduces carbon emissions, and saves energy.

An adjustment of the seat tube height and an operation of brakes of a conventional bicycle are achieved through transmission cables. A controller that connects the transmission cables is mounted in a handlebar, which allows a user to drive the transmission cables easily. When the bicycle is decelerated, the user grips brake-levers that are mounted in the handlebar to drive brakes by one of the transmission cables. When the seat tube height of the bicycle is adjusted, the user operates the controller to drive the other transmission cable that controls a retractable element. The retractable element extents or retracts to abut the seat tube, which adjusts the seat tube height of the bicycle.

However, the multiple transmission cables are mounted in a frame of the bicycle, and the transmission cables are exposed outside the frame. The transmission cables are disarrayed, and the user cannot easily organize the transmission cables. Besides, the transmission cable has multiple redundant segments in turning points of its arrangement, which can prevent the transmission cable from inactively driving the retractable element or the brake. Thus, the redundant segments make the transmission cables chaotically mounted in the frame.

SUMMARY OF THE INVENTION

An objective of the present invention is to provide an adjustable seat tube device for a bicycle that partially hides a transmission cable inside a seat tube to organize the transmission cable easily, to eliminate multiple redundant segments of the transmission cable, and to mount the transmission cable in the bicycle neatly.

To achieve the foregoing objective, the hidden adjustable seat tube device for a bicycle in accordance with the present invention comprises a lower tube assembly, an upper tube assembly, a manipulator, a transmission cable, and a retractable element. The lower tube assembly has a first rod and a driving element. The first rod has a mounting part, a connecting hole, and a mounting groove. The mounting part protrudes from an outer surface of the first rod. The connecting hole is defined axially through the first rod. The mounting groove is defined in an inner surface of the connecting hole along an axial direction of the first rod. The driving element is mounted rotatably on the first rod. The upper tube assembly has a second rod and an assembling base. The second rod is mounted movably in the first rod. The assembling base is mounted in the second rod. The manipulator is connected to the driving element. The transmission cable that is mounted through the mounting part and the mounting groove is disposed in the manipulator and the driving element respectively. The retractable element is mounted inside the second rod, abuts the assembling base, and has an actuating part. The actuating part abuts the driving element.

Other objectives, advantages and novel features of the invention will become more apparent from the following detailed description when taken in conjunction with the accompanying drawings.

DETAILED DESCRIPTION OF THE INVENTION

Figure 1:
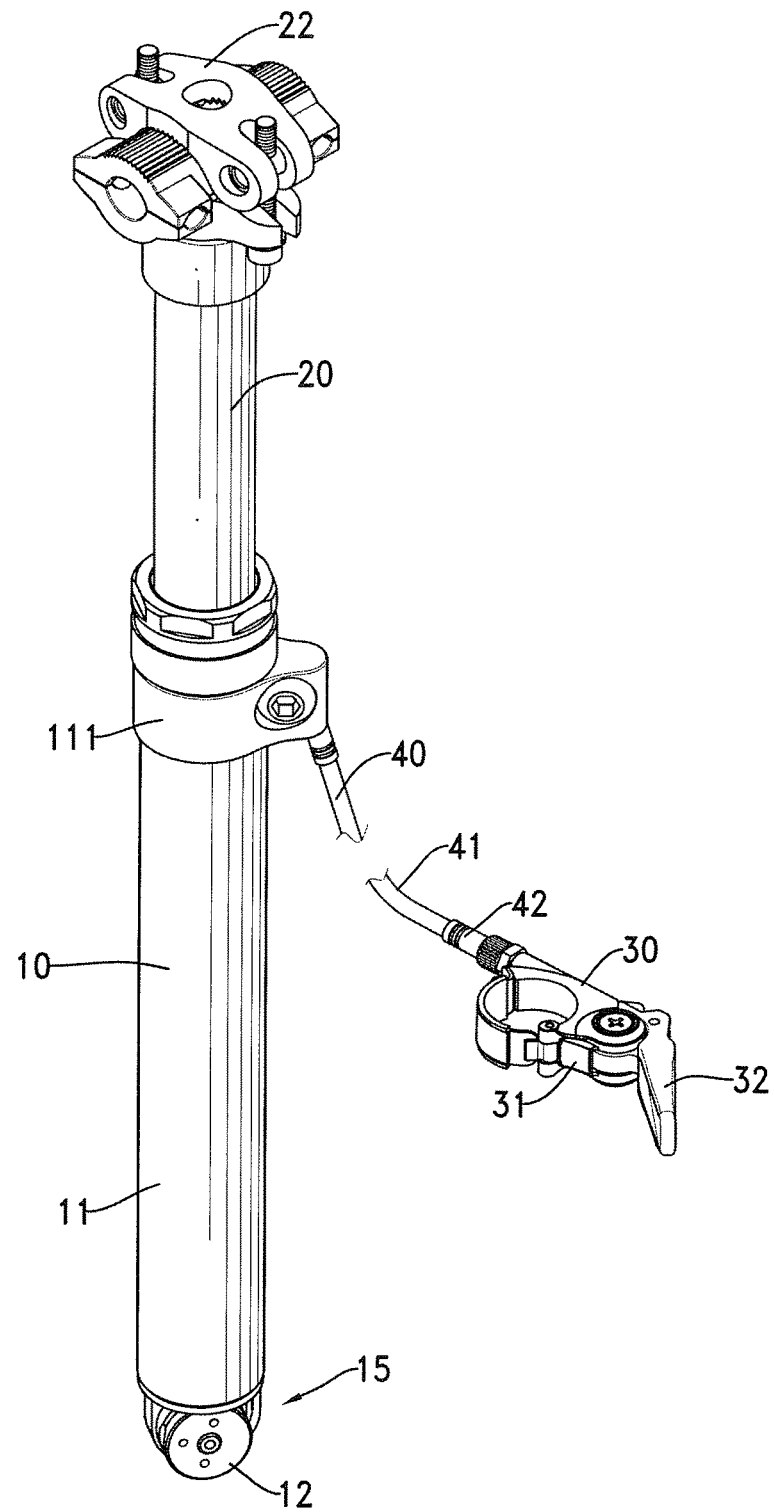
FIG. 1 is a perspective view of the hidden adjustable seat tube device for a bicycle in accordance with the present invention.
Figure 2:
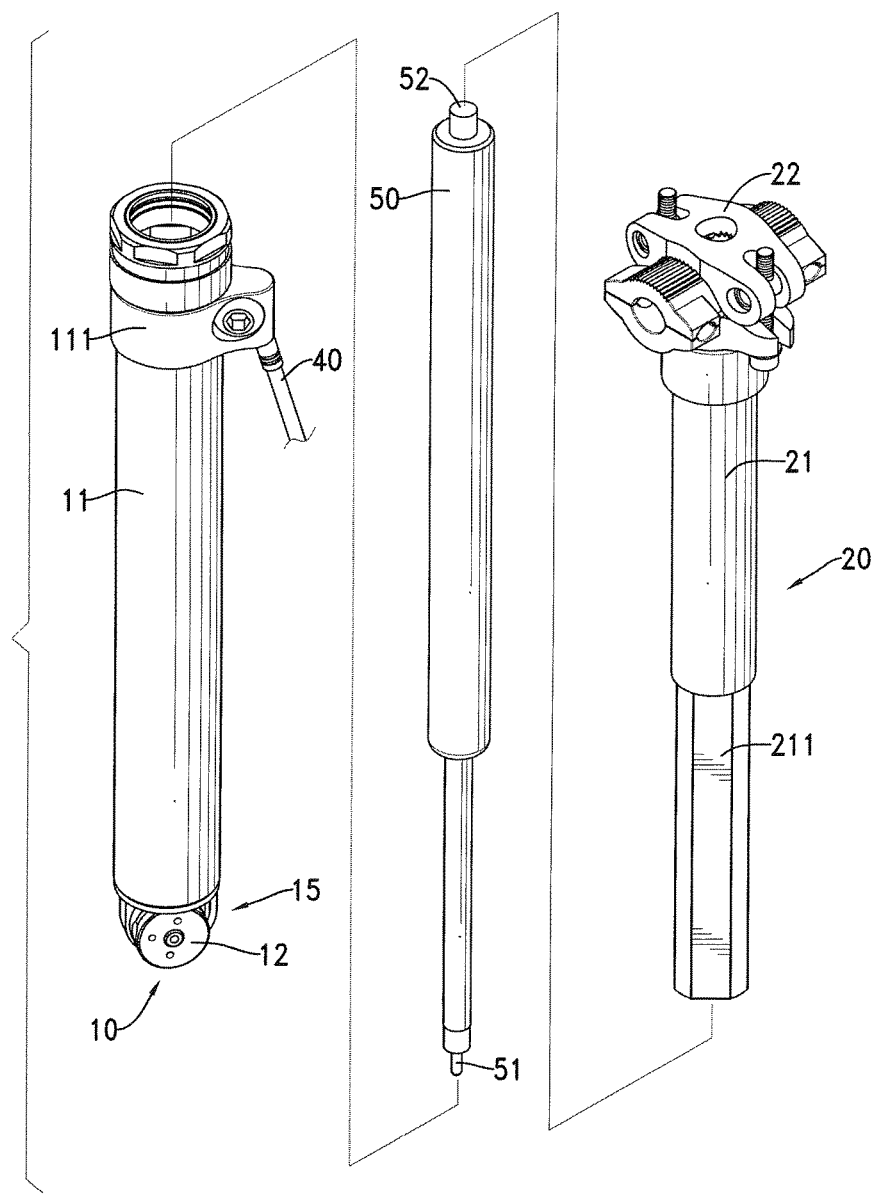
FIG. 2 is an exploded perspective view of the hidden adjustable seat tube device in FIG. 1.

With reference to FIGS. 1 and 2, a hidden adjustable seat tube device for a bicycle in accordance with the present application has a lower tube assembly 10, an upper tube assembly 20, a manipulator 30, a transmission cable 40, and a retractable element 50.

Figure 3:
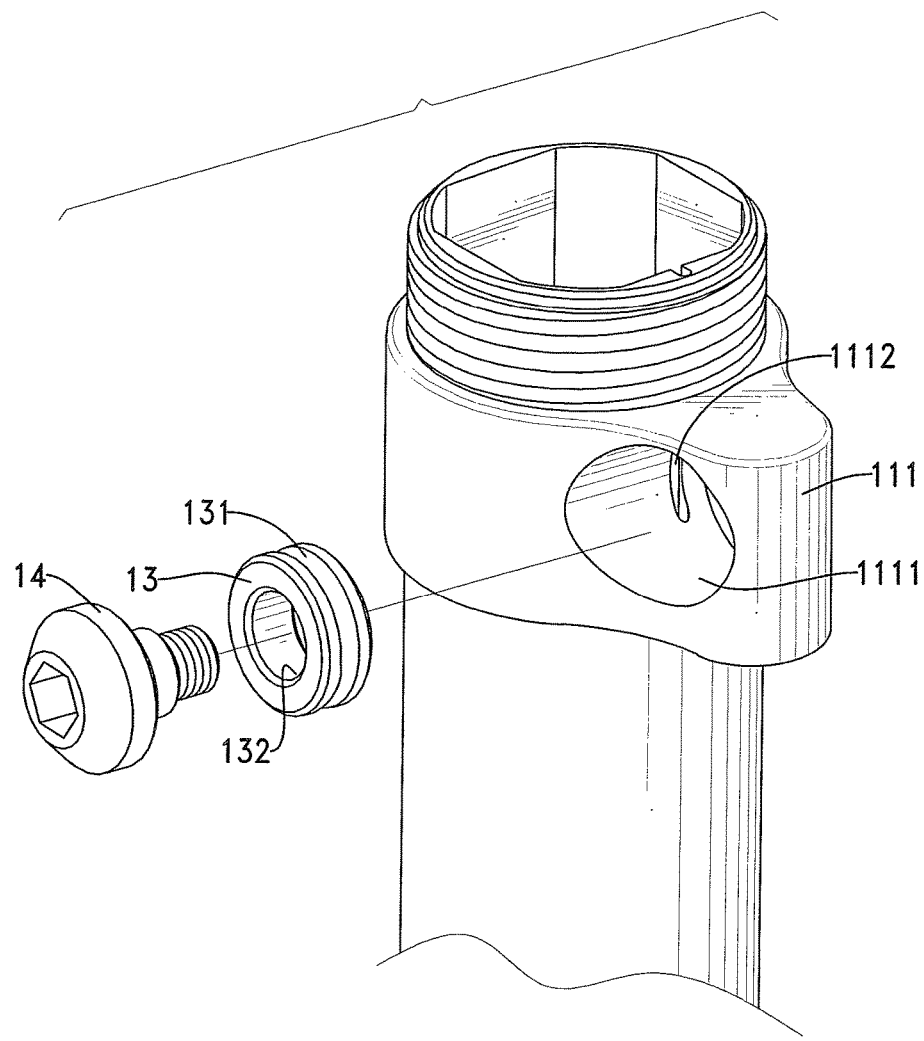
FIG. 3 is an enlarged exploded perspective view of the mounting part of the hidden adjustable seat tube device in FIG. 1.
Figure 4:
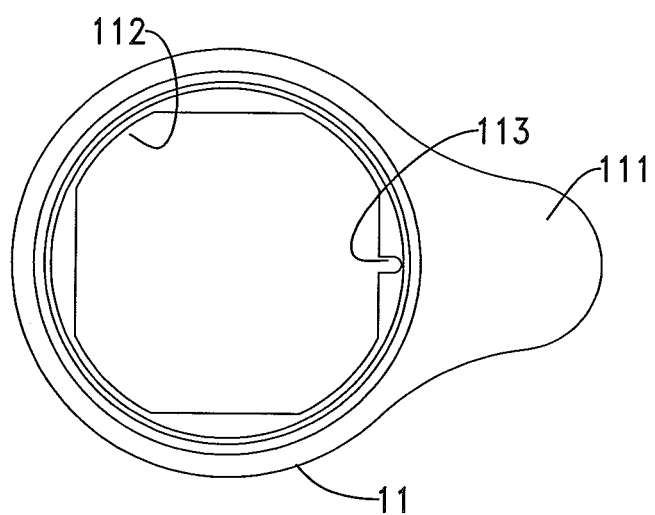
FIG. 4 is a top view of the first rod of the hidden adjustable seat tube device in FIG. 3.
Figure 5:
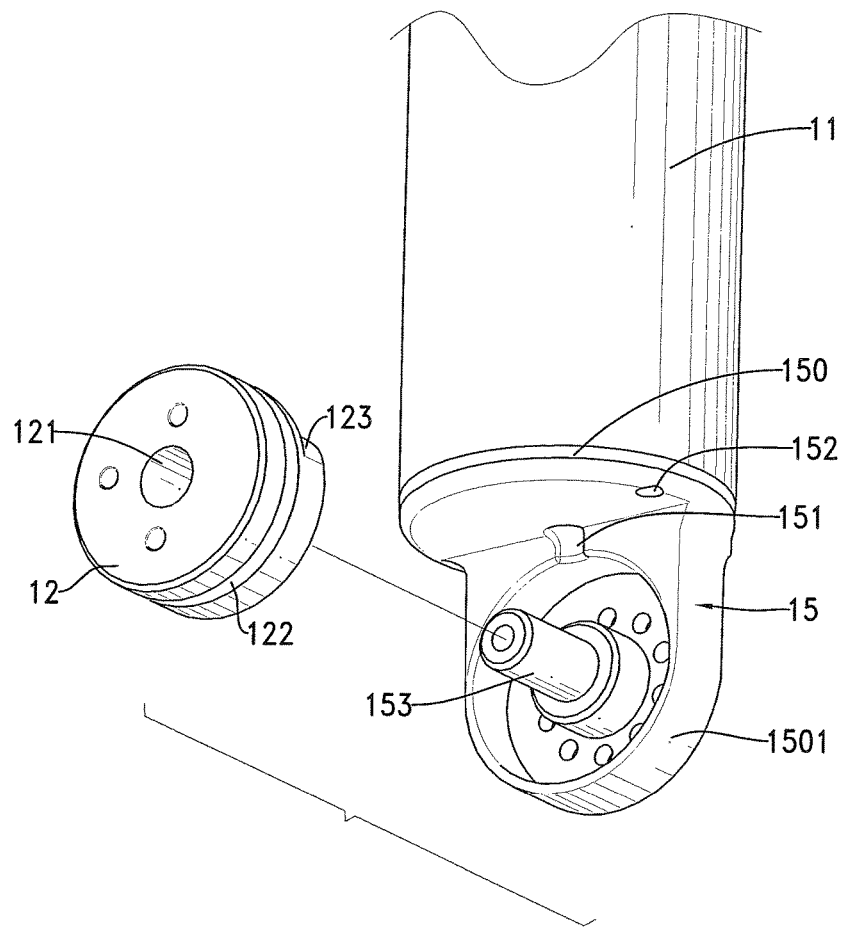
FIG. 5 is an enlarged exploded perspective view of the first rod of the hidden adjustable seat tube device in FIG. 2.

With reference to FIGS. 3 to 5, the lower tube assembly 10 has a first rod 11, a driving element 12, a wheel 13, a fastening element 14, and a terminal block 15.

The first rod 11 has a mounting part 111, a connecting hole 112, and a mounting groove 113. Specifically, the first rod 11 is mounted in a frame of a bicycle.

The mounting part 111 protrudes from an outer surface of one of two ends of the first rod 11 and has a first recess 1111, a first through hole 1112, and a second recess 1113.

The first recess 1111 is defined in one of two side surfaces of the mounting part 111.

The first through hole 1112 is defined through the first recess 1111 and communicates with the mounting groove 113.

The second recess 1113 is defined in a bottom surface of the mounting part 111 and communicates with the first recess 1111.

The connecting hole 112 is defined axially through the first rod 11.

The mounting groove 113 is defined in an inner surface of the connecting hole 112 along an axial direction of the first rod 11.

Figure 7:
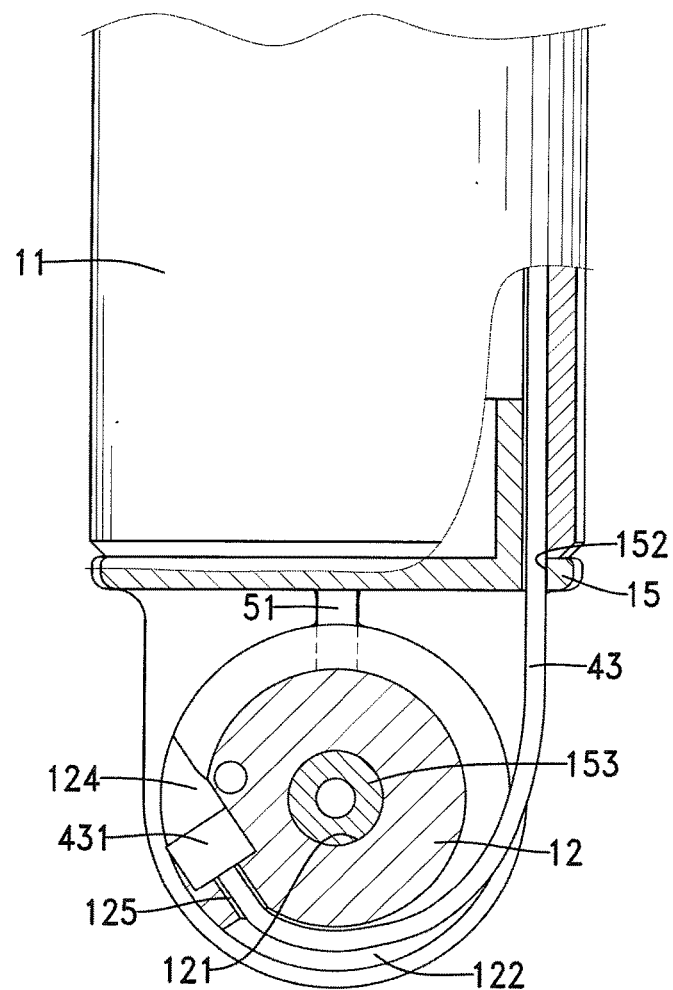
FIG. 7 is another partial sectional side view of the lower tube assembly of the hidden adjustable seat tube device in FIG. 1.

With reference to FIGS. 2, 5 and 7, the driving element 12 is mounted rotatably on the other end of the first rod 11, and has a first mounting hole 121, a first annular groove 122, a first abutting part 123, a positioning recess 124, and a first communicating hole 125. Specifically, the driving element 12 is circular.

The first mounting hole 121 is defined through a center of the driving element 12.

The first annular groove 122 is defined in an outer surface of the driving element 12.

The first abutting part 123 is formed on one of two side surfaces of the driving element 12. The first abutting part 123 has an uneven surface.

The positioning recess 124 is defined in the driving element 12 along a tangent direction of the driving element 12.

The first communicating hole 125 is defined in the driving element 12, and communicates with the positioning recess 124 and the first annular groove 122.

The wheel 13 is mounted rotatably inside the first recess 1111 and has a second annular groove 131 and a second mounting hole 132.

The second annular groove 131 is defined in an outer surface of the wheel 13.

The second mounting hole 132 is defined through the wheel 13 along an axial direction of the wheel 13.

The fastening element 14 is mounted through the second mounting hole 132, and is mounted in the other side surface of the mounting part 111. Specifically, the fastening element 14 is a screw.

The terminal block 15 is mounted in the first rod 11, is located adjacent to the driving element 12, and has a blocking base 150, a second communicating hole 151, a second through hole 152, and a mounting shaft 153.

The blocking base 150 is mounted in the first rod 11, and has an extending part 1501 that protrudes from one of two end surfaces of the blocking base 150.

The second communicating hole 151 is defined through a center of the terminal block 15 along an axial direction of the terminal block 15, communicates with the first rod 11, and corresponds to the first abutting part 123.

The second through hole 152 is defined through the terminal block 15 along the axial direction of the terminal block 15, and communicates with the first rod 11.

The mounting shaft 153 is mounted through the first mounting hole 121 and protrudes from the terminal block 15 along a radial direction of the terminal block 15 relative to the second communicating hole 151. Specifically, the mounting shaft 153 is mounted rotatably through the first mounting hole 121 of the driving element 12.

Specifically, the second communicating hole 151 and the second through hole 152 are defined in the blocking base 150, and the mounting shaft 153 protrudes from one of two side surfaces of the extending part 1501.

Figure 6:
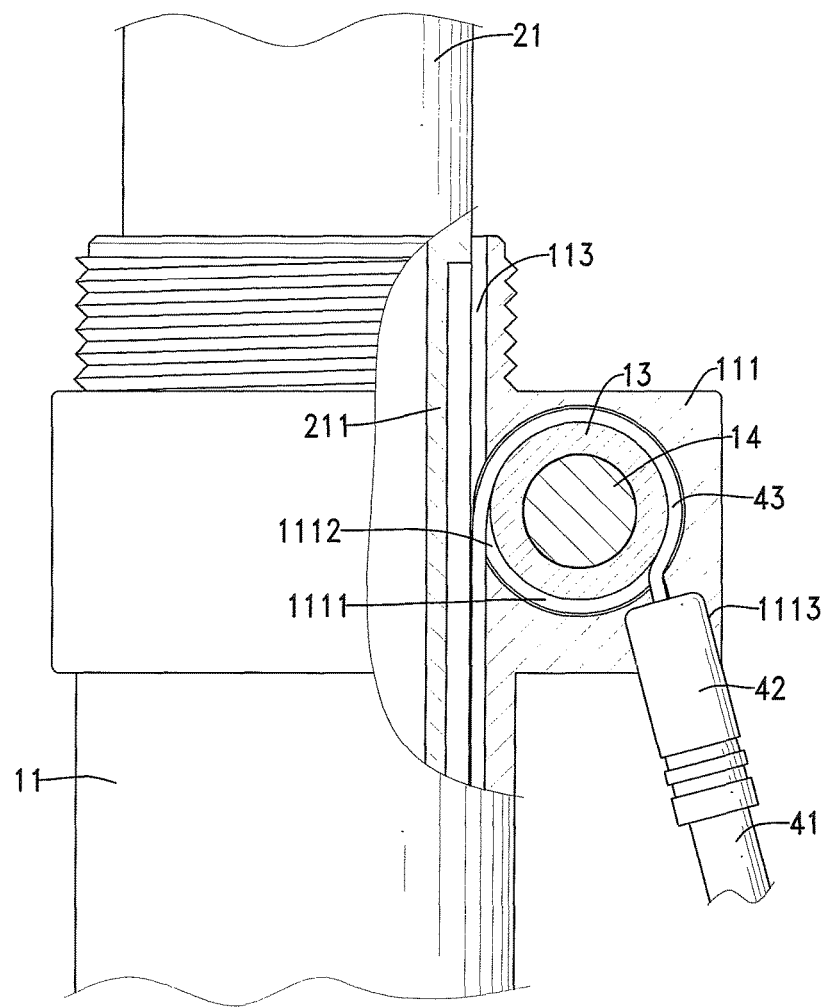
FIG. 6 is a partial sectional side view of the lower tube assembly of the hidden adjustable seat tube device in FIG. 1.

With reference to FIGS. 2 and 6, the upper tube assembly 20 is mounted movably in the lower tube assembly 10, and has a second rod 21 and an assembling base 22.

The second rod 21 is mounted movably in the first rod 11, and has a connecting part 211. One of two ends of the second rod 21 is mounted in the first rod 11.

The connecting part 211 is formed in an outer surface of the other end of the second rod 21, and is mounted inside the connecting hole 112.

The assembling base 22 is mounted in the other end of the second rod 21. Specifically, the assembling base 22 is used for attaching a saddle of the bicycle.

The manipulator 30 is connected to the driving element 12, and has a mounting base 31 and a trigger 32, as shown in FIG. 1.

The trigger 32 is mounted rotatably in the mounting base 31. Specifically, the mounting base 31 is mounted in a handlebar of the bicycle, which allows users to operate the trigger 32 easily.

The manipulator 30 is a conventional technique, and details thereof are omitted.

With reference to FIGS. 1, 6 and 7, the transmission cable 40 connects the manipulator 30 to the driving element 12, and has a sleeve 41, two terminal parts 42, and a cord element 43. Specifically, one of two ends of the transmission cable 40 is mounted in the manipulator 30, and the other end of the transmission cable 40 is mounted through the mounting part 111 and mounted in the driving element 12.

The terminal parts 42 are mounted in two ends of the sleeve 41, and abut the mounting base 31 and the second recess 1113 of the mounting part 111 respectively.

The cord element 43 is mounted inside the sleeve 41, is mounted through the terminal parts 42, is mounted in the trigger 32 and the driving element 12, and has a positioning block 431 that is mounted in one of the two ends of the transmission cable 40. Specifically, the end of the cord element 43 that has the positioning block 431 is mounted through the first recess 1111, the first through hole 1112, the second through hole 152, and the first communicating hole 125, and is mounted in the second annular groove 131 of the wheel 13, the mounting groove 113, and the first annular groove 122 of the driving element 12. The other end of the cord element 43 is mounted in the driving element 12.

The positioning block 431 is mounted and abuts inside the positioning recess 124 of the driving element 12.

As shown in FIGS. 2 and 7, the retractable element 50 is mounted in the second rod 21 and has an actuating part 51 and a second abutting part 52.

The actuating part 51 is mounted through the second communicating hole 151 of the terminal block 15, abuts the driving element 12, and is formed in one of two ends of the retractable element 50. Specifically, the actuating part 51 abuts the first abutting part 123 of the driving element 12.

The second abutting part 52 abuts the assembling base 22, and is formed in the other end of the retractable element 50.

The retractable element 50 is a conventional technique, and details thereof are omitted.

In the present invention, the driving element 12 abuts the actuating part 51 of the retractable element 50, which makes the retractable element 50 extent or retract. Specifically, the transmission cable 40 drives the driving element 12 to rotate, and the first abutting part 123 abuts the actuating part 51. Then, the assembling base 22 of the upper tube assembly 20 is abutted by the second abutting part 52 of the retractable element 50, which makes the upper tube assembly 20 extent or retract relative to the lower tube assembly 10.

The mounting groove 113 is defined in the inner surface of the first rod 11. Besides, the second through hole 152 is defined through the terminal block 15 for receiving the cord element 43. Therefore, a segment of the cord element 43 of the transmission cable 40 is hidden inside the first rod 11 of the lower tube assembly 10 to prevent the cord element 43 from being exposed outside the first rod 11. A user can organize the transmission cable 40 easily. Meanwhile, the wheel 13 that is mounted inside the mounting part 111 of the first rod 11 eliminates multiple redundant segments of the cord element 43 in turning points of an arrangement of the transmission cable 40.

Even though numerous characteristics and advantages of the present invention have been set forth in the foregoing description, together with details of the structure and function of the invention, the disclosure is illustrative only.

Changes may be made in detail, especially in matters of shape, size, and arrangement of parts within the principles of the invention to the full extent indicated by the broad general meaning of the terms in which the appended claims are expressed.

What is claimed is:

1. A hidden adjustable seat tube device for a bicycle, comprising:
   a lower tube assembly having:
      a first rod having:
         a mounting part protruding from an outer surface of one of two ends of the first rod;
         a connecting hole defined axially through the first rod; and
         a mounting groove defined in an inner surface of the connecting hole along an axial direction of the first rod; and
      a driving element mounted rotatably on another of the two ends of the first rod;
   an upper tube assembly having:
      a second rod mounted movably in the first rod, wherein one of two ends of the second rod is mounted inside the connecting hole; and
      an assembling base mounted in another of the two ends of the second rod;
   a manipulator connected to the driving element;
   a transmission cable mounted in the manipulator and the driving element, wherein one of two ends of the transmission cable is mounted in the manipulator, and another of the two ends of the transmission cable is mounted through the mounting part and the mounting groove, and is mounted in the driving element; and
   a retractable element mounted in the second rod and having an actuating part formed in one of two ends of the retractable element and abutting the driving element, wherein another of the two ends of the retractable element abuts the assembling base.

2. The hidden adjustable seat tube device for a bicycle as claimed in claim 1, wherein the mounting part of the first rod has:
   a first recess defined in one of two side surfaces of the mounting part;
   a first through hole defined through the first recess and communicating with the mounting groove; and
   a second recess defined in a bottom surface of the mounting part and communicating with the first recess;
   wherein the lower tube assembly further has:
   a wheel mounted rotatably inside the first recess and having:
      a second annular groove defined in an outer surface of the wheel; and
      a second mounting hole defined through the wheel along an axial direction of the wheel;
   a fastening element mounted through the second mounting hole, and mounted in another of the two side surfaces of the mounting part; and
   a terminal block mounted in the first rod, located adjacent to the driving element, and having:
      a second communicating hole defined through a center of the terminal block along an axial direction of the terminal block, communicating with the first rod, and receiving the actuating part of the retractable element;
      a second through hole defined through the terminal block along the axial direction of the terminal block, communicating with the first rod, and disposed around the transmission cable; and
      a mounting shaft protruding from the terminal block along a radial direction of the terminal block relative to the second communicating hole; wherein the driving element has:
      a first mounting hole defined through a center of the driving element, and mounted rotatably around the mounting shaft of the terminal block;
      a first annular groove defined in an outer surface of the driving element; and
      a first abutting part formed on one of two side surfaces of the driving element, corresponding to the second communicating hole, and abutted by the actuating part, wherein the first abutting part has an uneven surface; and wherein the transmission cable is mounted through the first recess, the first through hole and the second recess of the mounting part, is mounted in the second annular groove of the wheel, is mounted inside the mounting groove and the first annular groove, and connects to the driving element.

3. The hidden adjustable seat tube device for a bicycle as claimed in claim 2, wherein the driving element further has:
   a positioning recess defined in the driving element along a tangent direction of the driving element; and
   a first communicating hole defined in the driving element, and communicating with the positioning recess and the first annular groove; and wherein the transmission cable is mounted through the first communicating hole, is mounted in the first annular groove of the driving element, and has a positioning block mounted in one of the two ends of the transmission cable, and mounted and abutting inside the positioning recess.

4. The hidden adjustable seat tube device for a bicycle as claimed in claim 3, wherein the terminal block further has a blocking base mounted in the first rod, and having an extending part protruding from one of two end surfaces of the blocking base, wherein the second communicating hole and the second through hole are defined in the blocking base, and wherein the mounting shaft protrudes from one of two side surfaces of the extending part.

5. The hidden adjustable seat tube device for a bicycle as claimed in claim 3, wherein the second rod has a connecting part formed in an outer surface of the other end of the second rod, and mounted inside the connecting hole of the first rod.

6. The hidden adjustable seat tube device for a bicycle as claimed in claim 3, wherein the manipulator has:
   a mounting base; and
   a trigger mounted rotatably in the mounting base; and wherein the transmission cable has:
   a sleeve;
   two terminal parts mounted in two ends of the sleeve, with the two terminal parts abutting the mounting base and the mounting part of the first rod respectively; and
   a cord element mounted inside the sleeve, mounted through the terminal parts, and mounted in the trigger and the driving element.

7. The hidden adjustable seat tube device for a bicycle as claimed in claim 2, wherein the terminal block further has:
   a blocking base mounted in the first rod; and
   an extending part protruding from one of two end surfaces of the blocking base, wherein the second communicating hole and the second through hole are defined in the blocking base, and wherein the mounting shaft protrudes from one of two side surfaces of the extending part.

8. The hidden adjustable seat tube device for a bicycle as claimed in claim 2, wherein the second rod has a connecting part formed in an outer surface of the other end of the second rod, and mounted inside the connecting hole of the first rod.

9. The hidden adjustable seat tube device for a bicycle as claimed in claim 2, wherein the manipulator has:
- a mounting base; and
- a trigger mounted rotatably in the mounting base; and wherein the transmission cable has:
- a sleeve;
- two terminal parts mounted in two ends of the sleeve, and the two terminal parts abutting the mounting base, with the mounting part of the first rod respectively; and
- a cord element mounted inside the sleeve, mounted through the terminal parts, and mounted in the trigger and the driving element.

10. The hidden adjustable seat tube device for a bicycle as claimed in claim 1, wherein the second rod has a connecting part formed in an outer surface of the other end of the second rod, and mounted inside the connecting hole of the first rod.

11. The hidden adjustable seat tube device for a bicycle as claimed in claim 1, wherein the manipulator has:
- a mounting base; and
- a trigger mounted rotatably in the mounting base; and wherein the transmission cable has:
- a sleeve;
- two terminal parts mounted in two ends of the sleeve, with the two terminal parts abutting the mounting base and the mounting part of the first rod respectively; and
- a cord element mounted inside the sleeve, mounted through the terminal parts, and mounted in the trigger and the driving element.

\* \* \* \* \*